United States Patent
Zhu et al.

(10) Patent No.: US 10,627,594 B2
(45) Date of Patent: Apr. 21, 2020

(54) FIBER OPTIC PULLING GRIP ASSEMBLY

(71) Applicant: Amphenol Fiber Optic Technology (Shenzhen) Co., Ltd., Shenzhen, Guangdong Province (CN)

(72) Inventors: Ling-Hua Zhu, Shenzhen (CN); Anh Nguyen, Shenzhen (CN); Ronald J. Kleckowski, Shenzhen (CN); Xing-Fu Mo, Shenzhen (CN); Shu-Hui Hsu, Kaohsiung (TW)

(73) Assignee: Amphenol Fiber Optic Technology (Shenzhen) Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 16/259,497

(22) Filed: Jan. 28, 2019

(65) Prior Publication Data

US 2020/0018916 A1    Jan. 16, 2020

(30) Foreign Application Priority Data

Jul. 11, 2018   (TW) .............................. 107209347 U (51) Int. Cl.
  *G02B 6/38*    (2006.01)
  *G02B 6/44*    (2006.01)
  *H02G 1/08*    (2006.01)

(52) U.S. Cl.
  CPC ......... *G02B 6/4471* (2013.01); *G02B 6/4465* (2013.01); *H02G 1/081* (2013.01)

(58) Field of Classification Search
  USPC .................................. 385/100, 106, 109, 136
  See application file for complete search history.

(56) References Cited

U.S. PATENT DOCUMENTS

| | | | | |
|---|---|---|---|---|
| 2,833,567 | A | * 5/1958 | Bacher | F16L 33/16 285/95 |
| 4,786,134 | A | * 11/1988 | Fort | G02B 6/25 225/96 |
| 5,378,027 | A | * 1/1995 | Gehring | F16L 5/06 285/322 |
| 9,835,807 | B2 | * 12/2017 | Zhu | G02B 6/3825 |
| 2019/0305476 | A1 | * 10/2019 | Kralik | H01R 43/26 |

OTHER PUBLICATIONS

Google Search, Earl's AN fitting, 2019.*

* cited by examiner

*Primary Examiner* — Eric Wong
(74) *Attorney, Agent, or Firm* — Muncy, Geissler, Olds & Lowe, P.C.

(57) ABSTRACT

A fiber optic pulling grip assembly includes a sleeve unit sleeving around a cable section of a fiber optic cable and a guiding unit. The sleeve unit includes a sleeve member, an insertion tube received in a receiving space extending along the sleeve member, and a blocking member connected to the sleeve member. The guiding unit includes a fixing ring disposed between an optical fiber section and a mesh of the fiber optic cable, a rear portion connected to the sleeve member to clamp a rear end of the mesh, a front portion defining a channel for passing of the optical fiber section and the mesh, a connecting member connected to the optical fiber section and a pulling member connected to the front portion to clamp a front end of the mesh.

4 Claims, 8 Drawing Sheets

FIBER OPTIC PULLING GRIP ASSEMBLY

CROSS-REFERENCE TO RELATED APPLICATION

This application claims priority of Taiwanese Utility Model Patent Application No. 107209347, filed on Jul. 11, 2018.

FIELD

The disclosure relates to a fiber optic pulling grip assembly, and more particularly to a fiber optic pulling grip assembly including a sleeve unit and a guiding unit cooperatively securing a mesh surrounding an optical fiber section of a fiber optic cable.

BACKGROUND

Figure 1:
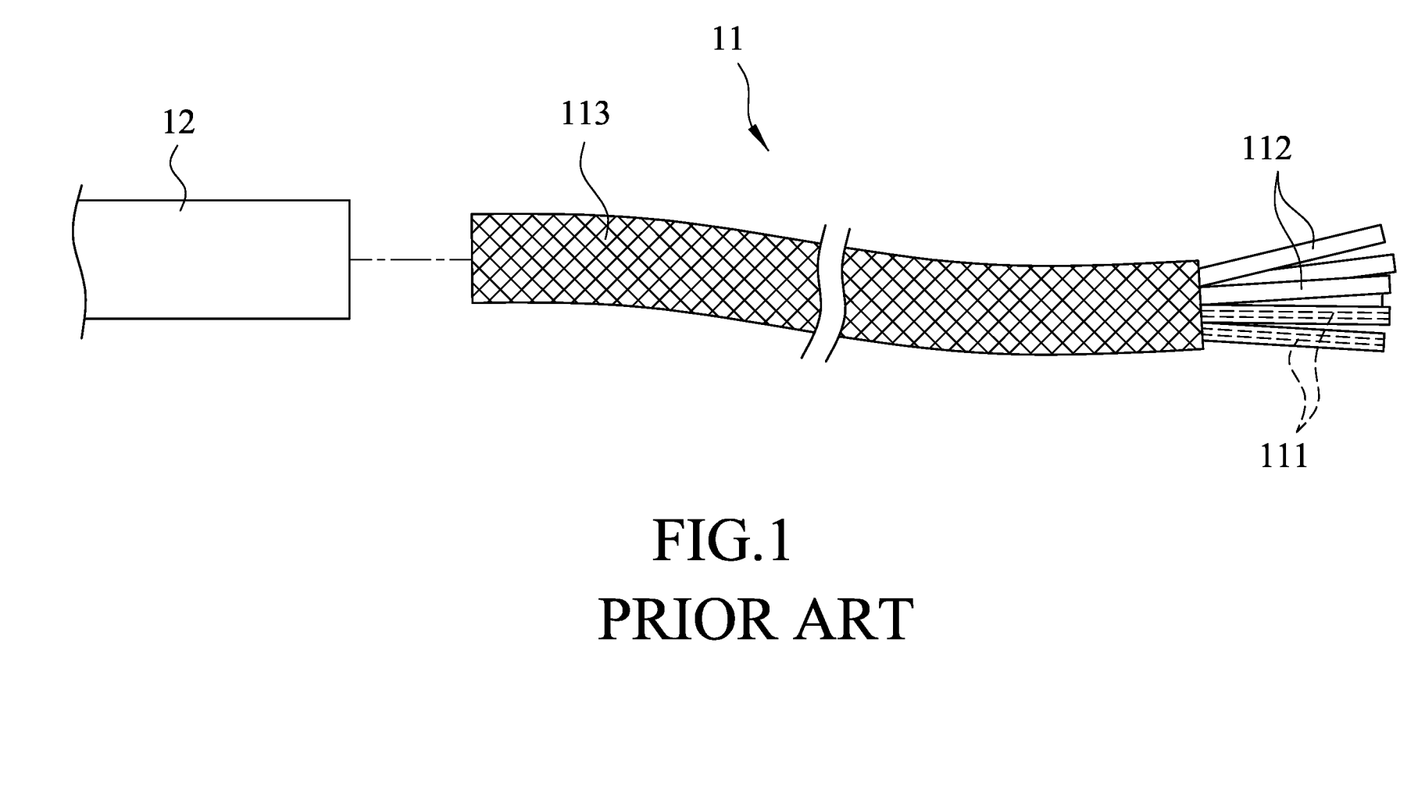
FIG. 1 is a schematic view illustrating a conventional fiber optic cable for insertion into an installation pipe.

As shown in FIG. 1, a fiber optic cable 11 may be inserted into an installation pipe 12. The fiber optic cable 11 includes a plurality of optical fibers 111, a plurality of plastic sleeves 112 respectively disposed around the optical fibers 111, and a mesh 113 covering the plastic sleeves 112. For installation of an optical fiber network within a building wall of a building, the installation pipe 12 is buried into the building wall for receiving the fiber optic cable 11. Because the optical fibers 111 are fragile, the plastic sleeves 112 are used to protect the optical fibers 111. During insertion of the fiber optic cable 11, abrasion between the fiber optic cable 11 and the installation pipe 12 is inevitable. The mesh 113 functions to prevent the plastic sleeves 112 from being damaged due to inevitable abrasion.

However, the mesh 113 is disposed around the plastic sleeves 112 without being fixed to the plastic sleeves 112. When pulling forces are applied to the installation pipe 12 during the process of installing the fiber optic cable 11, the fiber optic cable 11 is subjected to repeated stresses that pull the fiber optic cable 11 relative to the installation pipe 12. Therefore, the mesh 113 may easily slide and displace relative to the plastic sleeves 112. The displacement of the mesh 113 may result in exposure of the two ends of the plastic sleeves 112 from the mesh 113. Without protection of the mesh 113 during the insertion of the fiber optic cable 11 into the installation pipe 12, the plastic sleeves 112 are easily worn and torn due to abrasion, leading to damage of the optical fibers 111.

In addition, a communication device, such as a digital television, a network television, or a wireless local area network (LAN) device, is in widespread use. The fiber optic cable 11 is generally provided with a cable adaptor so as to be connected between a distribution board for domestic installation and an outdoor network wiring system. There is plenty of room for improving protection of the fiber optical cable that is required to fit the conventional cable adapter and to be received in the installation pipe 12 buried into the building wall.

SUMMARY

Therefore, an object of the disclosure is to provide a fiber optic pulling grip assembly that can alleviate at least one of the drawbacks of the prior art.

According to the disclosure, a fiber optic pulling grip assembly is used for a fiber optic cable. The fiber optic cable has a cable section, an optical fiber section, a connector connected between the cable section and the optical fiber section, and a mesh surrounding the optical fiber section. The fiber optic pulling grip assembly includes a sleeve unit and a guiding unit.

The sleeve unit is configured to sleeve around the cable section and includes a sleeve member, an insertion tube, and a blocking member.

The sleeve member includes a sleeve body, a first threaded portion and a first inner thread. The sleeve body has a front end, a rear end opposite to the front end, an inner surface, an outer surface opposite to the inner surface and an insertion-tube receiving space. Both of the inner and outer surfaces extend from the front end to the rear end. The insertion-tube receiving space extends through the sleeve body and is surrounded by the inner surface. The first threaded portion frontally extends from the front end of the sleeve body. The first inner thread is disposed at the inner surface at the rear end of the sleeve body and extends toward the front end.

The insertion tube is received in the insertion-tube receiving space and defines a passage for passing of the cable section of the fiber optic cable.

The blocking member is threadedly connected to the rear end of the sleeve member and includes a blocking body formed with a through hole in spatial communication with the passage and a second threaded portion extending frontally from the blocking body and formed with an outer thread threadedly connected to the first inner thread of the sleeve member.

The guiding unit is configured to be connected to the optical fiber section of the fiber optic cable and includes a fixing ring, a rear portion, a front portion, a connecting member and pulling member.

The fixing ring is disposed between the optical fiber section and the mesh at an end of the guiding unit proximal to the connector.

The rear portion is releasably and threadedly connected to the first threaded portion of the sleeve member of the sleeve unit so as to clamp a rear end of the mesh between the fixing ring and the first threaded portion.

The front portion defines a channel for passing of the optical fiber section and the mesh and has a base portion and a third threaded portion extending frontally from the base portion.

The connecting member is configured to be connected to a front end of the optical fiber section.

The pulling member includes a main portion, a second inner thread and a pulling ring. The main portion has a front end, a rear end that is opposite to the front end and that is connected to the front portion, and a connecting-member receiving space that extends from the front end to the rear end. The main portion cooperates with the connecting member to clamp a front end of the mesh therebetween. The second inner thread is disposed at the rear end of the main portion and is threadedly connected to the third threaded portion of the front portion. The pulling ring is connected to the front end of the main portion.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
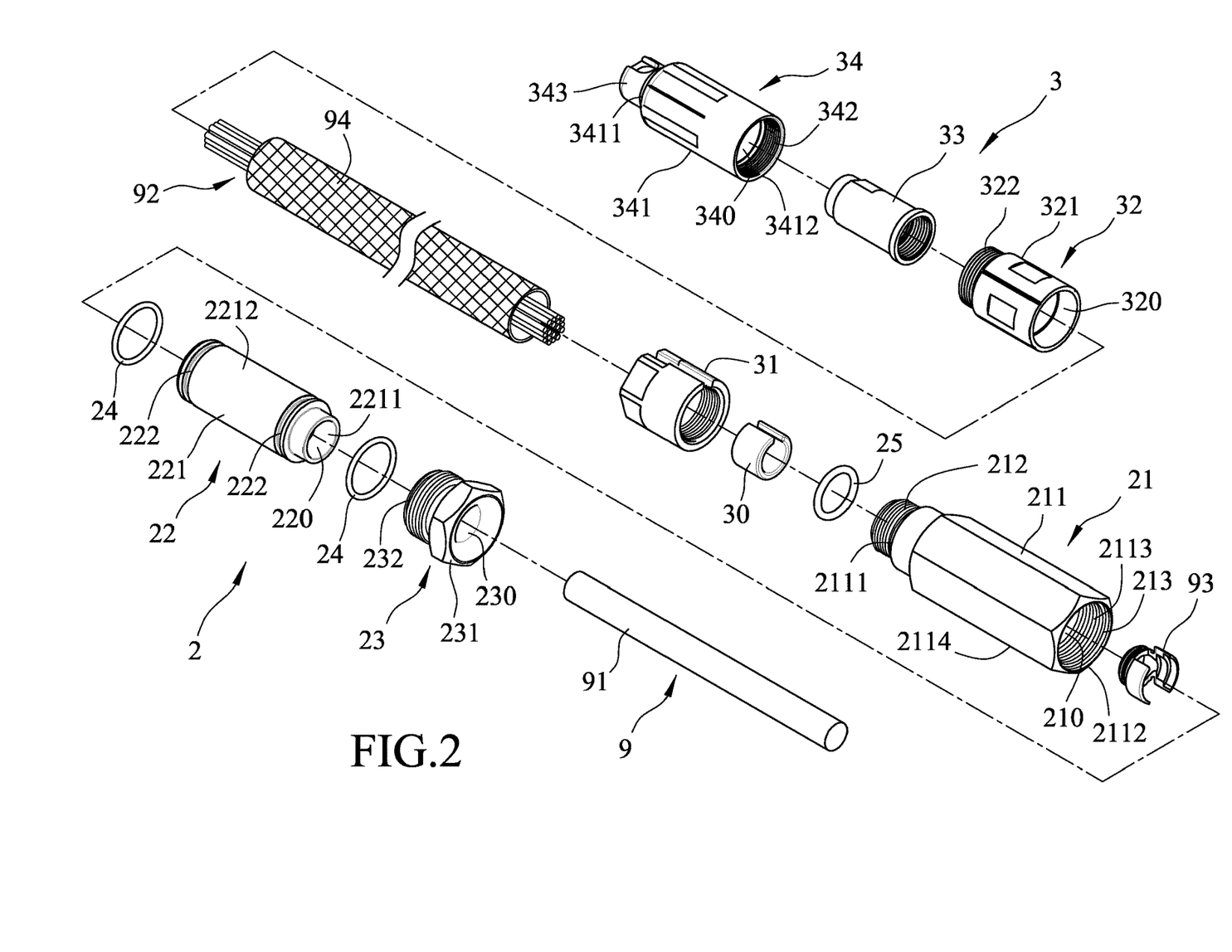
FIG. 2 is an exploded view illustrating an embodiment of a fiber optic pulling grip assembly according to the disclosure applied to a fiber optic cable.
Figure 3:
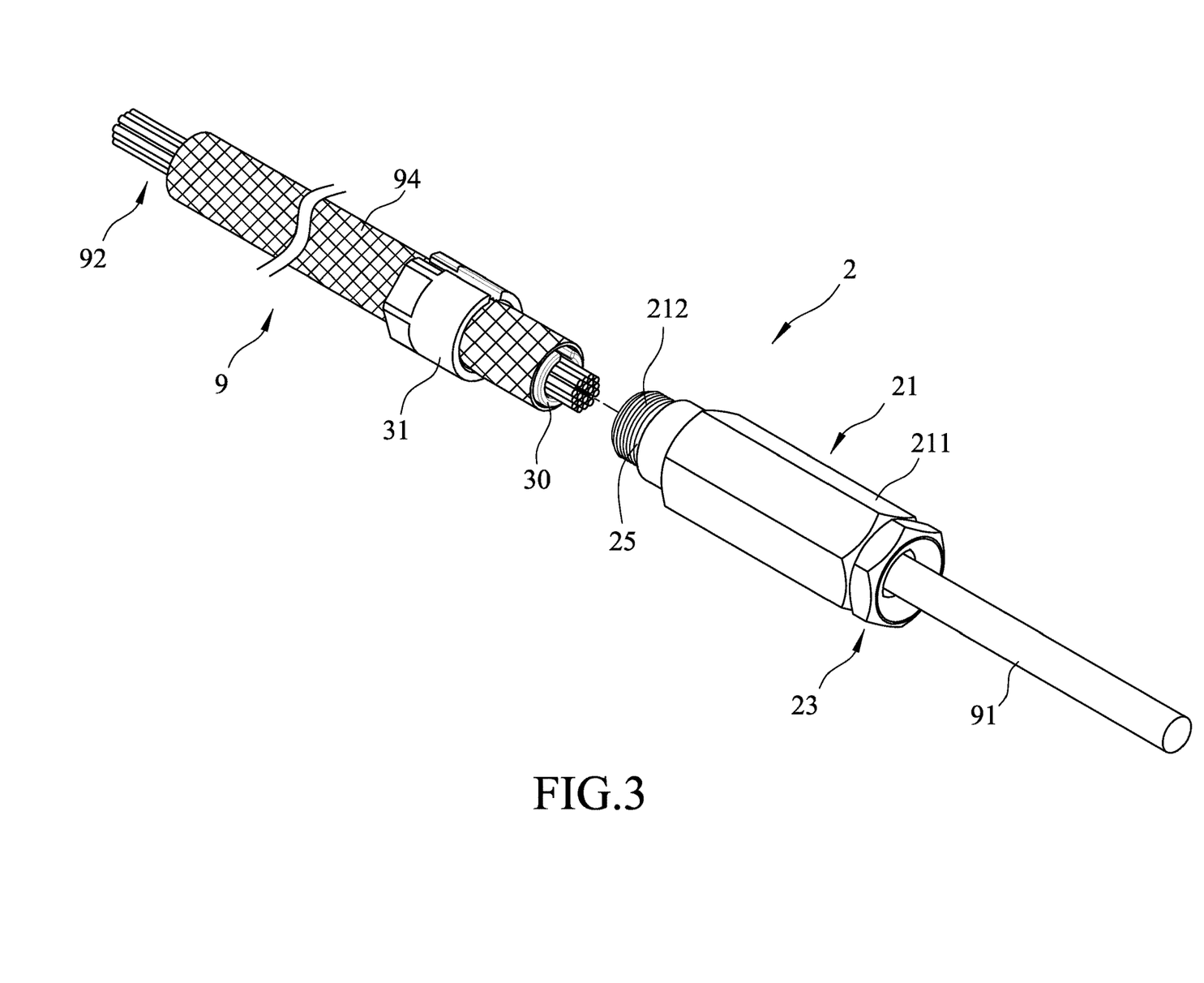
FIG. 3 is a fragmentary exploded view illustrating a sleeve unit of the embodiment assembled with the fiber optic cable.
Figure 4:
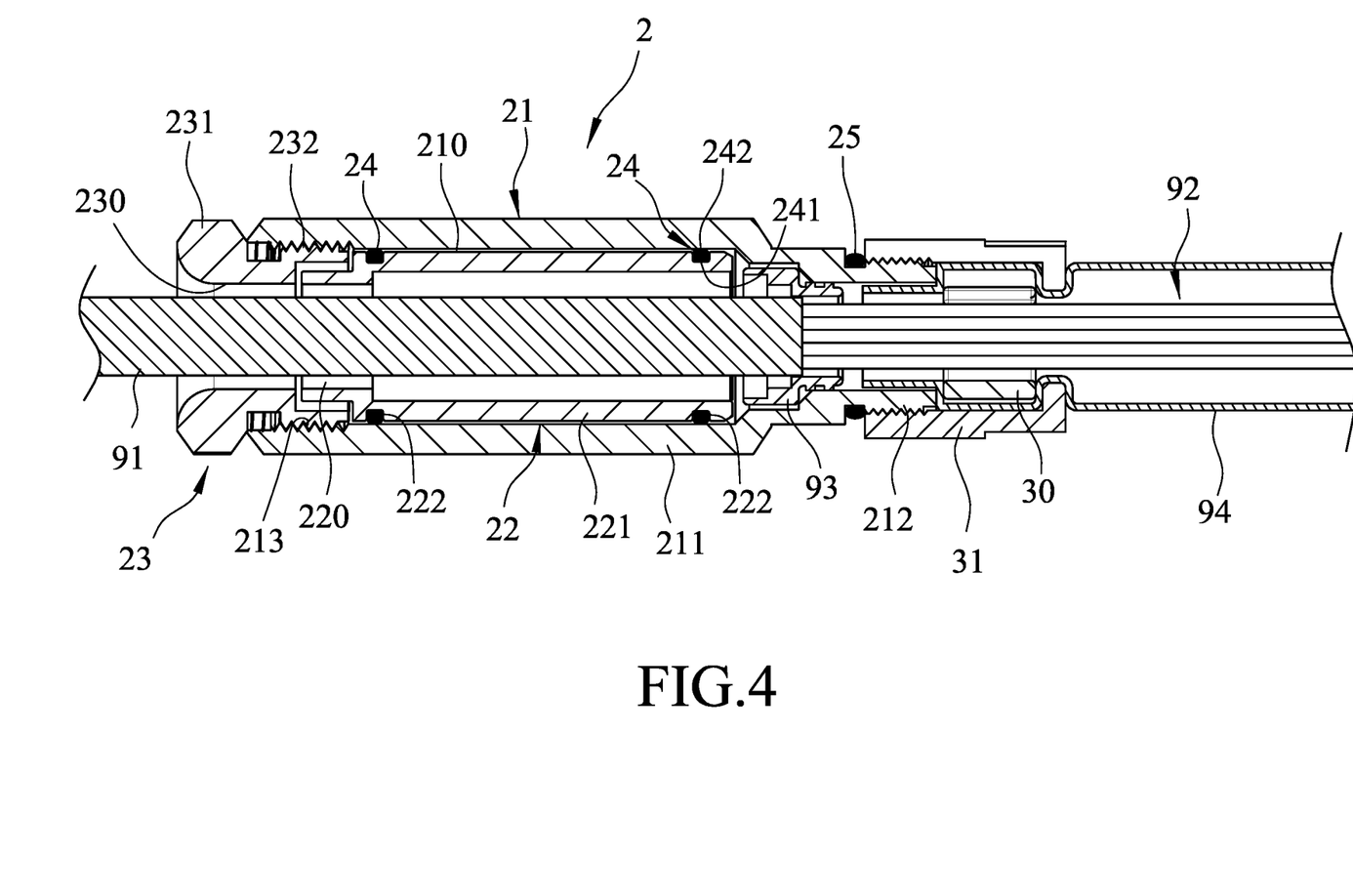
FIG. 4 is a fragmentary cross-sectional view illustrating the sleeve unit of the embodiment assembled with the fiber optic cable.

Referring to FIGS. 2 to 4, an embodiment of a fiber optic pulling grip assembly according to the disclosure includes a sleeve unit 2 and a guiding unit 3. The fiber optic pulling grip assembly of the disclosure is suitable for a fiber optic cable 9. The fiber optic cable 9 has a cable section 91, an optical fiber section 92, a connector 93 connected between the cable section 91 and the optical fiber section 92, and a mesh 94 surrounding the optical fiber section 92 for protecting the optical fiber section 92. The sleeve unit 2 is configured to sleeve around the cable section 91, and the guiding unit 3 is configured to be connected to the optical fiber section 92. The cable section 91 of the fiber optic cable 9 may serve as an outdoor cable to be used with an outdoor network system, and the optical fiber section 92 of the fiber optic cable 9 may be applicable to an indoor optical-fiber circuit system for connecting various communication apparatuses, such as a wireless local area network (LAN) device and an internet television. The connector 93 may be an adapter in conformance with a specification for connecting a cable and an optical fiber.

The sleeve unit 2 includes a sleeve member 21 including a sleeve body 211, a first threaded portion 212, and a first inner thread 213. The sleeve body 211 has a front end 2111, a rear end 2112 opposite to the front end 2111, an inner surface 2113, an outer surface 2114 opposite to the inner surface 2113, and an insertion-tube receiving space 210. Both of the inner surface 2113 and the outer surface 2114 extend from the front end 2111 to the rear end 2112. The insertion-tube receiving space 210 extends through the sleeve body 211 and is surrounded by the inner surface 2113 of the sleeve body 211. The first threaded portion 212 frontally extends from the front end 2111 of the sleeve body 211. The first inner thread 213 is disposed at the inner surface 2113 at the rear end 2112 of the sleeve body 211 and extends toward the front end 2111.

The sleeve unit 2 further includes an insertion tube 22 that is received in the insertion-tube receiving space 210 and that defines a passage 220 for passing of the cable section 91 of the fiber optic cable 9, a blocking member 23 that is threadedly connected to the rear end 2112 of the sleeve member 21, a pair of inner water-proof rings 24 disposed between the sleeve member 21 and the insertion tube 22, and an outer water-proof rings 25 surrounding the sleeve member 21.

In this embodiment, the insertion tube 22 includes a tubular portion 221 having an inner surface 2211 that surrounds the passage 220 and an outer surface 2212 that is opposite to the inner surface 2111, and a pair of spaced-apart surrounding grooves 222 surroundingly formed on the outer surface 2212 of the tubular portion 221. The inner water-proof rings 24 fittingly sleeve around the surrounding grooves 222, respectively. Each of the inner water-proof rings 24 has an inner side 241 in contact with the outer surface 2112 of the tubular portion 221 of the insertion tube and an outer side 242 opposite to the inner side 241 and in contact with the inner surface 2113 of the sleeve body 211 of the sleeve member 21. With the inclusion of the inner water-proof rings 24, the sleeve member 21 and the insertion tube 22 are enabled to couple to each other in a watertight manner, the optical fiber section 92 of the fiber optical cable 9 disposed indoors can be prevented from a negative influence of the outdoor moisture.

The blocking member 23 of the sleeve unit 2 includes a blocking body 231 and a second threaded portion 232 that extends frontally from the blocking body 231. The blocking body 231 is formed with a through hole 230 that is in spatial communication with the passage 220. The second threaded portion 232 is formed with an outer thread threadedly connected to the first inner thread 213 of the sleeve member 21. The cable section 91 of the fiber optic cable 9 passes through the passage 220 via the through hole 230. With the threaded connection between the second threaded portion 232 and the first inner thread 213, the blocking member 23 is threadedly connected to the sleeve member 21. Moreover, with the first threaded portion 212 abutting against the insertion tube 22, the insertion tube 22 can be fixedly received in the insertion-tube receiving space 210.

Figure 5:
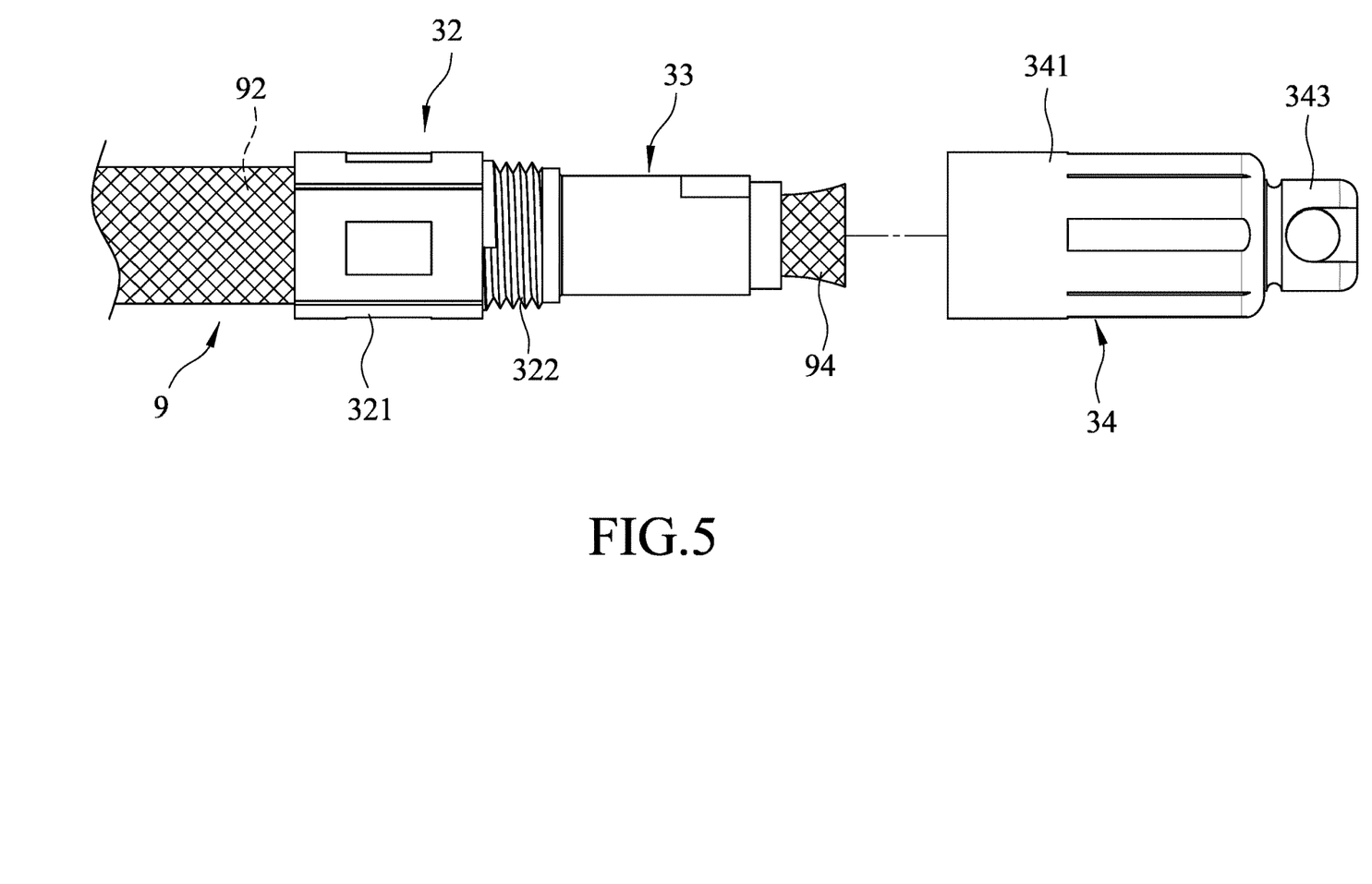
FIG. 5 is a fragmentary side view illustrating a guiding unit of the embodiment assembled with the fiber optic cable.
Figure 6:
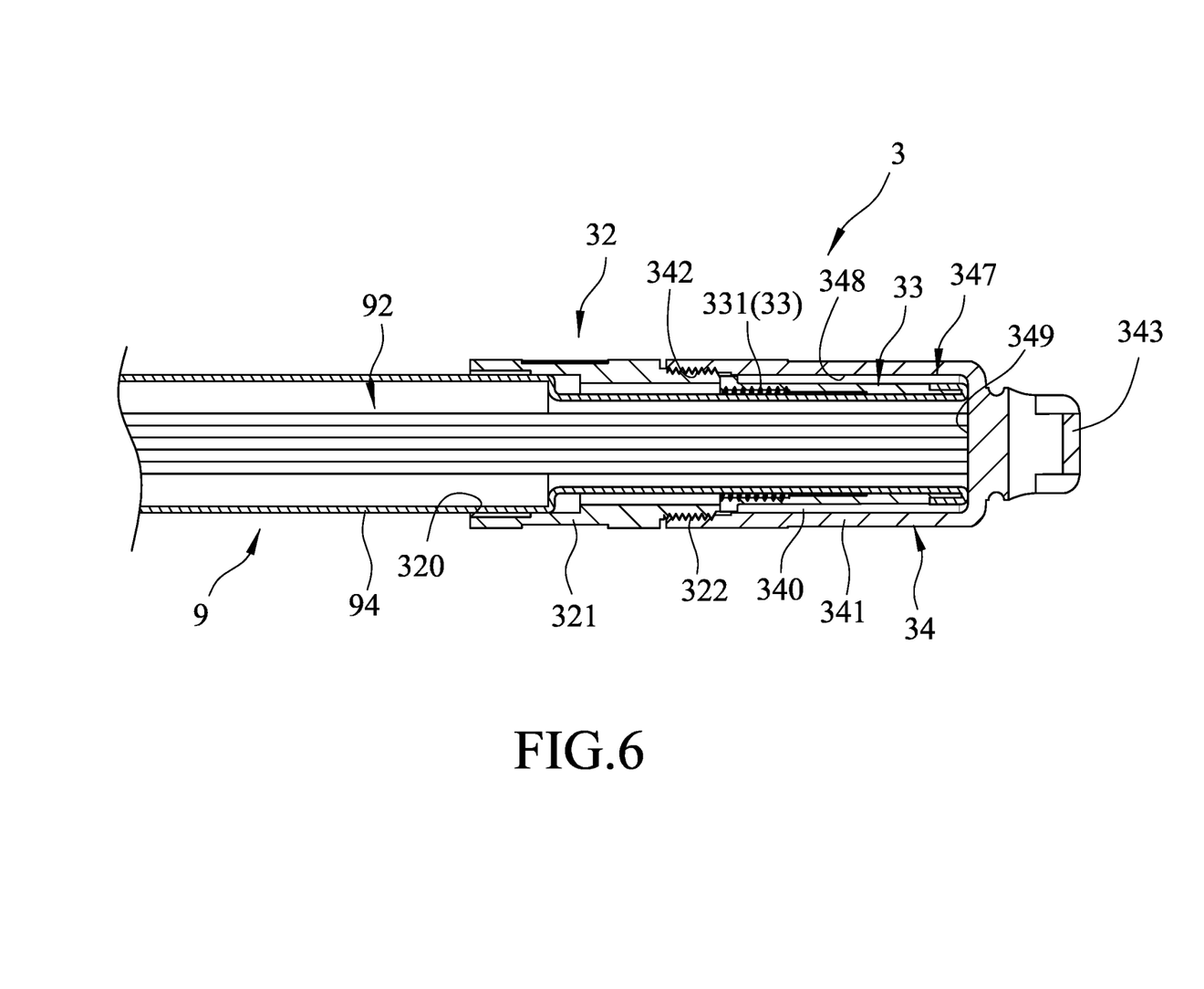
FIG. 6 is a fragmentary cross-sectional view illustrating the guiding unit of the embodiment assembled with the fiber optic cable.

Further referring to FIGS. 5 and 6, the guiding unit 3 includes a fixing ring 30 disposed between the optical fiber section 92 and the mesh 94 at an end of the guiding unit 3 proximal to the connector 93, a rear portion 31 releasably and threadedly connected to the first threaded portion 212 of the sleeve member 21 of the sleeve unit 2, a front portion 32 defining a channel 320 for passing of the optical fiber section 92 and the mesh 94, a connecting member 33 configured to be connected to a front end of the optical fiber section 92 of the fiber optic cable 9, and a pulling member 34 connected to the front portion 32.

Referring back to FIG. 3, in this embodiment, the fixing ring 30 is urged by the rear portion 31 to move toward the first threaded portion 212 of the sleeve member 21 of the sleeve unit as the rear portion 31 is threadedly connected to the first threaded portion 212, so that a rear end of the mesh 94 is clamped between the fixing ring 30 and the first threaded portion 212. Referring back to FIG. 4, the outer water-proof ring 25 fittingly surrounds the first threaded portion 212 of the sleeve member 21 and abuts against the sleeve body 211 of the sleeve member 21 and the rear portion 31 of the guiding unit 3 so as to prevent permeation of the outdoor moisture into the insertion-tube receiving space 210 from a joint between the rear portion 31 and the sleeve member 21. Therefore, the undesired influence of the outdoor moisture on the optical fiber section 92 of the fiber optic cable 9 can be avoided.

In this embodiment, the front portion 32 of the guiding unit 3 has a base portion 321 and a third threaded portion 322 that extends frontally from the base portion 321.

In this embodiment, the connecting member 33 is in the shape of a tube, and includes an inner thread 331 extending frontally from a rear end of the connecting member 33 for connecting an external component (not shown) so as to further connect the optical fiber section 92 to other communication apparatuses disposed indoors.

The pulling member 34 of the guiding unit 3 includes a main portion 341, a second inner thread 342, and a pulling ring 343. The main portion 341 has a front end 3411 and a rear end 3412 that is opposite to the front end 3411 and that is connected to the front portion 32, and a connecting-member receiving space 340 that extends from the front end 3411 to the rear end 3412. The main portion 341 cooperates with the connecting member 33 to clamp a front end of the mesh 94 therebetween. The second inner thread 342 is disposed at the rear end 3412 of the main portion 341 and is threadedly connected to the third threaded portion 322 of the front portion 32. The pulling ring 343 is connected to the front end 3411 of the main portion 341. When the optical fiber section 92 of the fiber optic cable 9 is inserted into the guiding unit 3 to pass through the front portion 32 and the connecting member 33, a front end of the mesh 94 of the fiber optic cable 9 will protrude out of the connecting member 33. The main portion 341 further has an inner surface 347 that has a surrounding region 348 surrounding the connecting-member receiving space 340, and an end surface region 349 connected to the surrounding region 348 and located at the front end 3411 to form a closed end. When the pulling member 34 is threadedly connected to the front portion 32 through the second inner thread 342, the front portion 32 will abut against the rear end of the connecting member 33 so as to move the connecting member 33 toward the end surface region 349 of the inner surface 347 of the main portion 341. Hence, the connecting member 33 cooperates with the end surface region 349 to clamp the front end of the mesh 94 therebetween.

Figure 7:
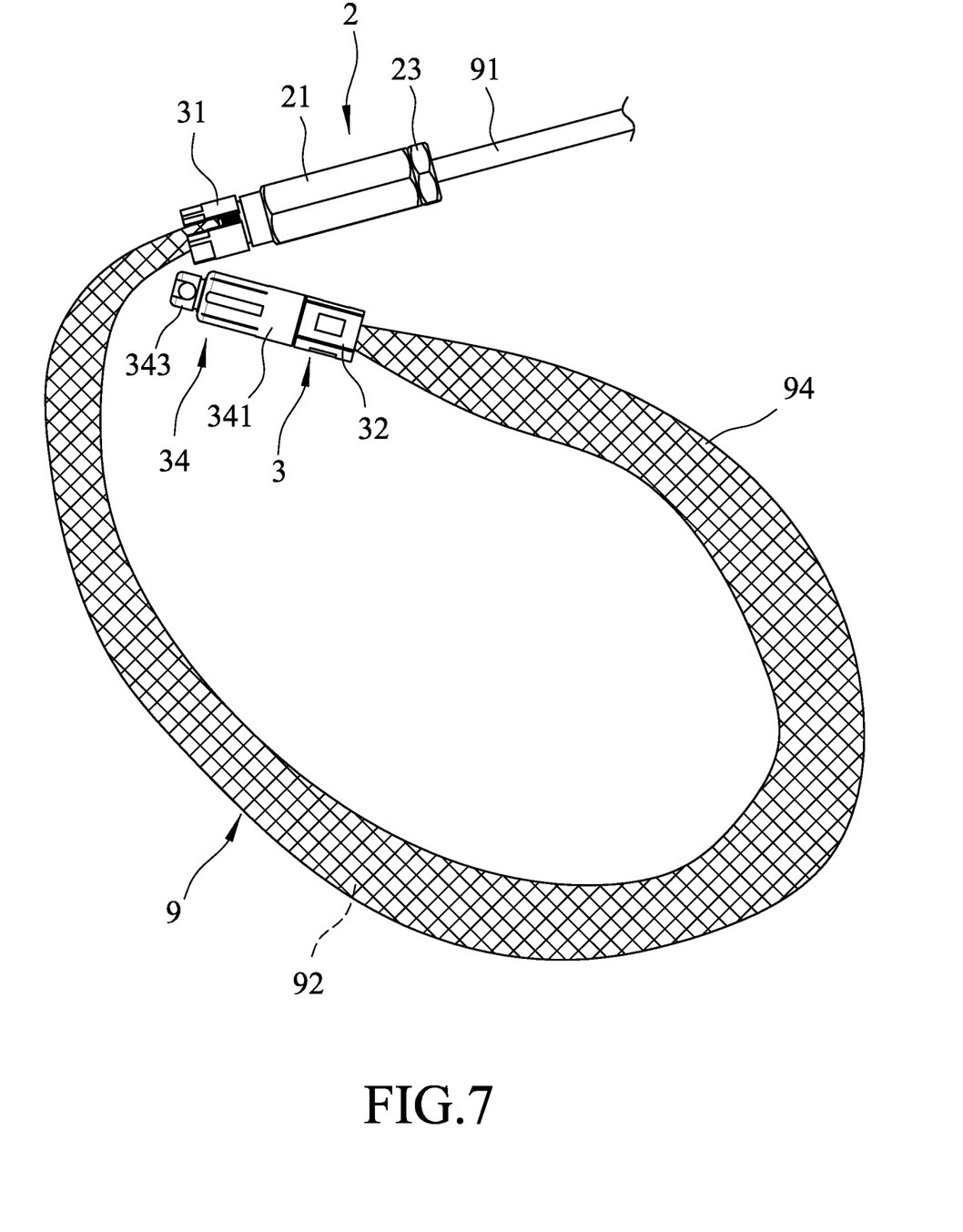
FIG. 7 is a schematic view illustrating assembling of the sleeve unit, the guiding unit and the fiber optic cable.
Figure 8:
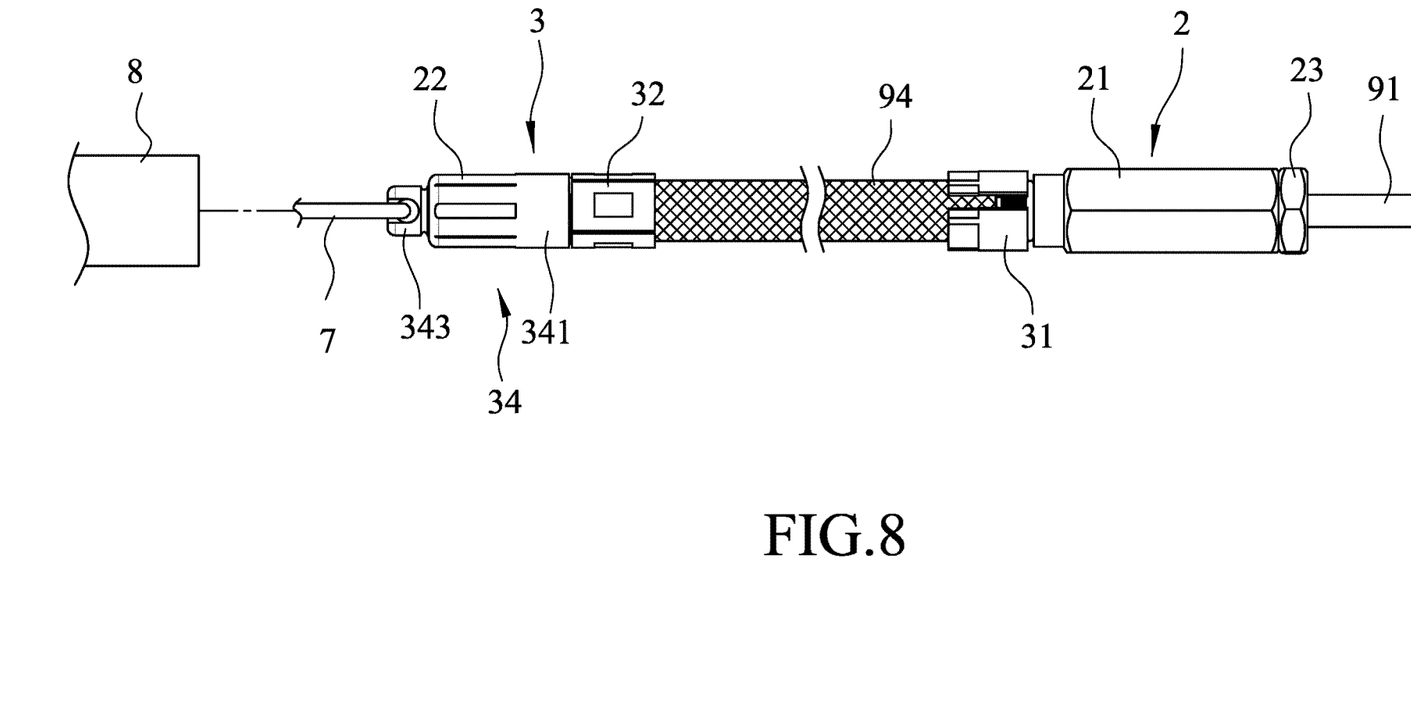
FIG. 8 is a fragmentary schematic view illustrating accommodation of the fiber optic cable provided with the embodiment of the fiber optic pulling grip assembly in an installation pipe.

Referring to FIGS. 6 and 7, when the fiber optic pulling grip assembly is used to connect the fiber optic cable 9, the sleeve unit 2 and the guiding unit 3 will be respectively connected to the cable section 91 and the optical fiber section 92 of the fiber optic cable 9. Since the front and rear ends of the mesh 94 are clamped through cooperation of the sleeve unit 2 and the guiding unit 3, the mesh 94 will not move relative to the optical fiber section 92. Consequently, the optical fiber section 92 can be appropriately protected by the mesh 94 during the insertion of the fiber optic cable 9. Further referring to FIG. 8, when the fiber optical cable 9 assembled with the fiber optical pulling grip assembly of the disclosure is intended to be inserted into an installation pipe 8, an additional pulling wire 7 is first tied on the pulling ring 343 of the puling member 34 and passes through the installation pipe 8. Then, the fiber optic cable 9 assembled with the fiber optic pulling grip assembly can be led by the additional pulling wire 7 into and through the installation pipe 8 by pulling on the additional pulling wire 7. As mentioned before, with the fiber optic pulling grip assembly of the disclosure, the mesh 94 is sufficiently and firmly secured during the drawing and arrangement of the fiber optic cable 9.

To sum up, by virtue of the design of the fiber optic pulling grip assembly of the disclosure, the rear end of the mesh 94 of the optic fiber cable 9 is clamped between the first threaded portion 212 of the sleeve unit 2 and the fitting ring 30 of the guiding unit 3, and the front end of the mesh 94 is clamped between the connecting member 33 and the pulling member 34 of the guiding unit 3. The installation of the fiber optic cable 9 is thus completed under protection of the mesh 94 which has been sufficiently and firmly secured.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic pulling grip assembly for a fiber optic cable, the fiber optic cable having a cable section, an optical fiber section, a connector connected between the cable section and the optical fiber section, and a mesh surrounding the optical fiber section, comprising:
   a sleeve unit configured to sleeve around the cable section and including
      a sleeve member including
         a sleeve body having a front end, a rear end opposite to said front end, an inner surface, an outer surface opposite to said inner surface, both of said inner and outer surfaces extending from said front end to said rear end, and an insertion-tube receiving space extending through said sleeve body and surrounded by said inner surface,
         a first threaded portion frontally extending from said front end of said sleeve body, and
         a first inner thread disposed at said inner surface at said rear end of said sleeve body and extending toward said front end,
      an insertion tube received in said insertion-tube receiving space and defining a passage for passing of the cable section of the fiber optic cable, and
      a blocking member threadedly connected to said rear end of said sleeve member and including
         a blocking body formed with a through hole in spatial communication with said passage, and
         a second threaded portion extending frontally from said blocking body and formed with an outer thread threadedly connected to said first inner thread of said sleeve member; and
   a guiding unit configured to be connected to the optical fiber section of the fiber optic cable and including
      a fixing ring disposed between the optical fiber section and the mesh at an end of said guiding unit proximal to the connector,
      a rear portion releasably and threadedly connected to said first threaded portion of said sleeve member of said sleeve unit so as to clamp a rear end of the mesh between said fixing ring and said first threaded portion,
      a front portion defining a channel for passing of the optical fiber section and the mesh and having a base portion and a third threaded portion extending frontally from said base portion, a connecting member configured to be connected to a front end of the optical fiber section, and a pulling member including a main portion having a front end, a rear end opposite to said front end and connected to said front portion, and a connecting-member receiving space extending from said front end to said rear end, said main portion cooperating with said connecting member to clamp a front end of the mesh therebetween, a second inner thread disposed at said rear end of said main portion and threadedly connected to said third threaded portion of said front portion, and a pulling ring connected to said front end of said main portion.

2. The fiber optic pulling grip assembly of claim 1, wherein said insertion tube of said sleeve unit includes a tubular portion having an inner surface surrounding said passage and an outer surface opposite to said inner surface, and a pair of spaced-apart surrounding grooves surroundingly formed on said outer surface of said tubular portion; and wherein said sleeve unit further includes a pair of inner water-proof rings fittingly sleeving around said surrounding grooves, respectively, each of said inner water-proof rings having an inner side that is in contact with said outer surface of said tubular portion of said insertion tube and an outer side that is opposite to said inner side and in contact with said inner surface of said sleeve body of said sleeve member.

3. The fiber optic pulling grip assembly of claim 1, wherein said sleeve unit further includes an outer water-proof ring that fittingly surrounds said first threaded portion of said sleeve member and abutting against said sleeve body of said sleeve member and said rear portion of said guiding unit.

4. The fiber optic pulling grip assembly of claim 1, wherein said front end of said main portion of said pulling member of said guiding unit is a closed end and cooperates with said connecting member to clamp the front end of the mesh.

\* \* \* \* \*